United States Patent [19]
Humphrey

[11] 3,869,806
[45] Mar. 11, 1975

[54] LEVELLING INSTRUMENT
[76] Inventor: David H. Humphrey, Gen. P.O. Box 2226, San Juan, P.R.
[22] Filed: Jan. 2, 1973
[21] Appl. No.: 320,207

Related U.S. Application Data
[63] Continuation-in-part of Ser. No. 252,339, May 10, 1972, Pat. No. 3,793,735.

[52] U.S. Cl............................ 33/348, 33/379, 33/391
[51] Int. Cl............................................... G01c 9/00
[58] Field of Search ............. 33/348, 366, 379, 391; 356/149

[56] References Cited
UNITED STATES PATENTS

| 1,820,791 | 8/1931 | Forrest | 33/348 |
| 1,918,904 | 7/1933 | Gette, Jr. | 33/348 X |
| 2,372,091 | 3/1945 | Land | 33/348 X |
| 3,597,090 | 8/1971 | Humphrey | 356/149 |
| 3,673,697 | 7/1972 | Wasson | 33/348 |
| 3,772,798 | 11/1973 | Kijima | 33/348 |

Primary Examiner—William D. Martin, Jr.
Attorney, Agent, or Firm—Molinare, Allegretti, Newitt & Witcoff

[57] ABSTRACT

A levelling instrument wherein a non-level condition is indicated by the projection of a light beam within the instrument on an indicator. The light beam is projected in a constant vertical direction by a reflecting surface that is rotatable about a light source. The light is focused on a left or right direction indicator to indicate when the instrument is not level. When the indicators are activated, the instrument is not in a level position. The reflecting surface can comprise a pendulum mirror or a continuous circular conduit partially filled with mercury.

15 Claims, 13 Drawing Figures

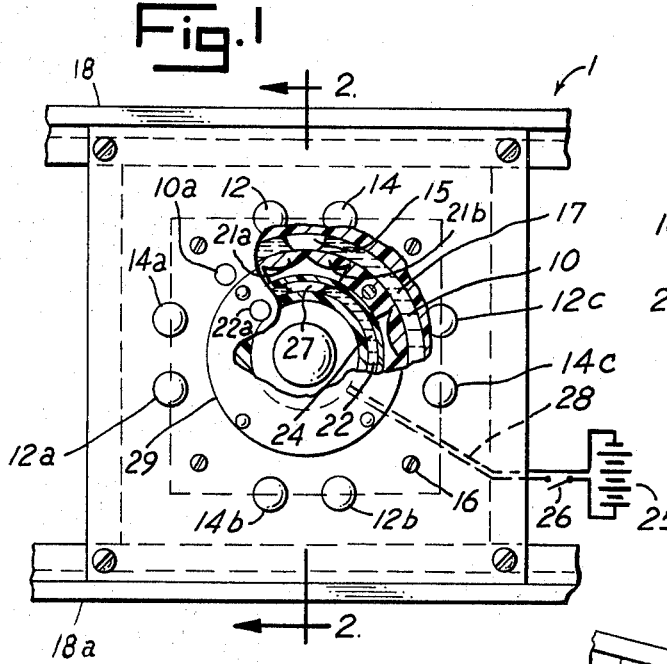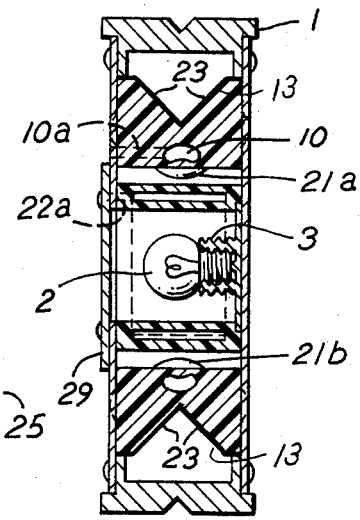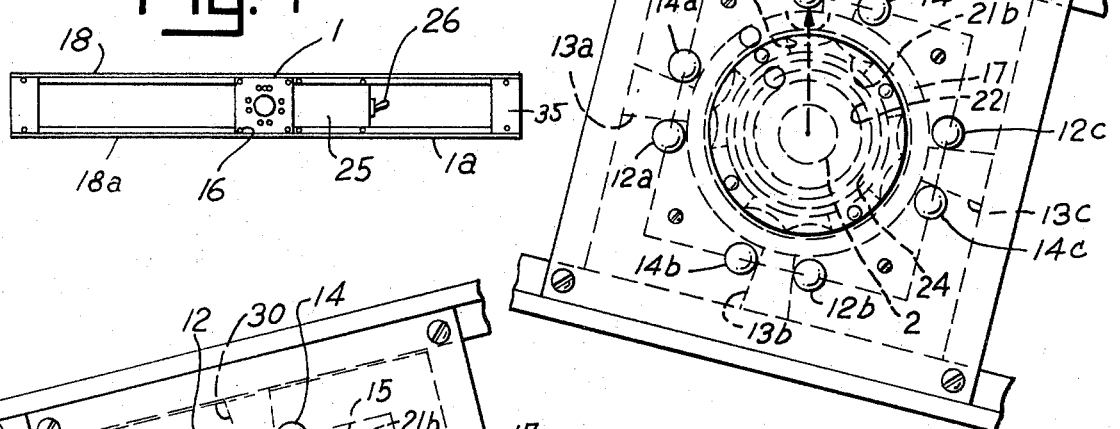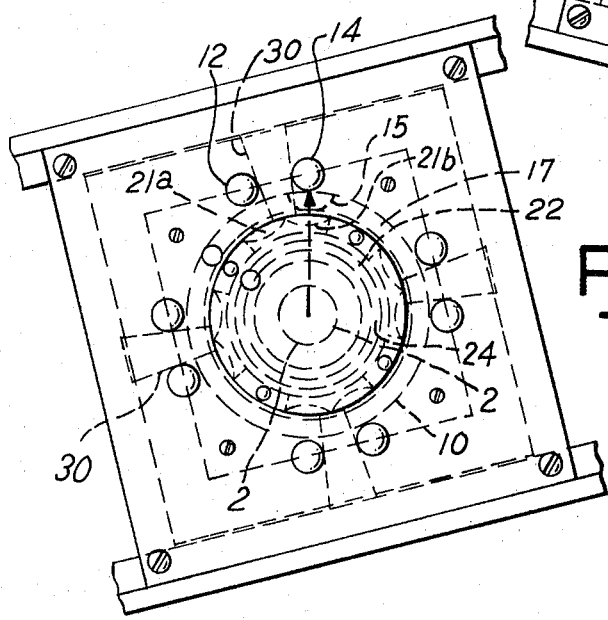

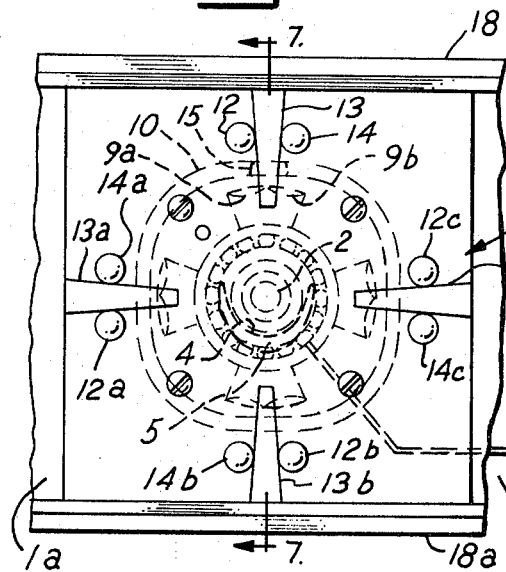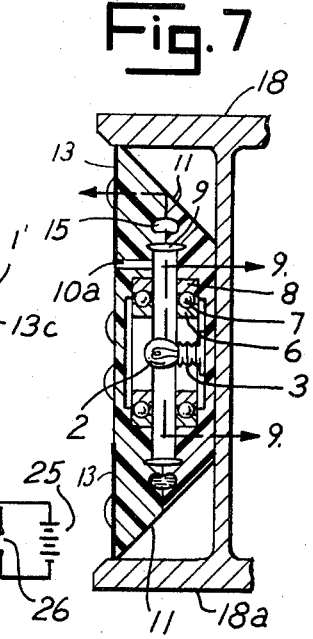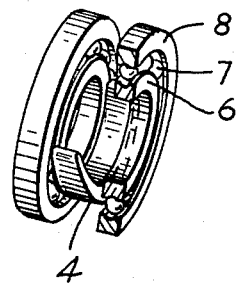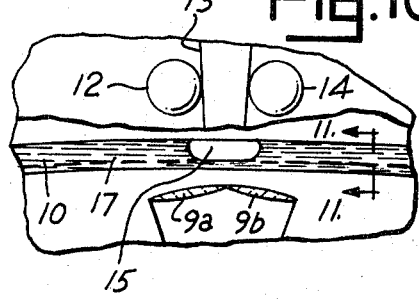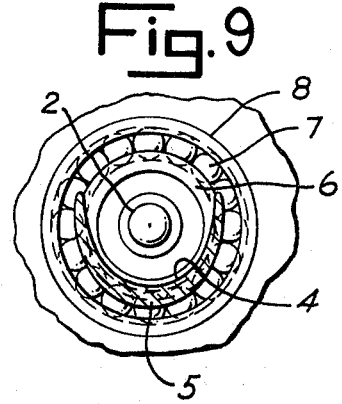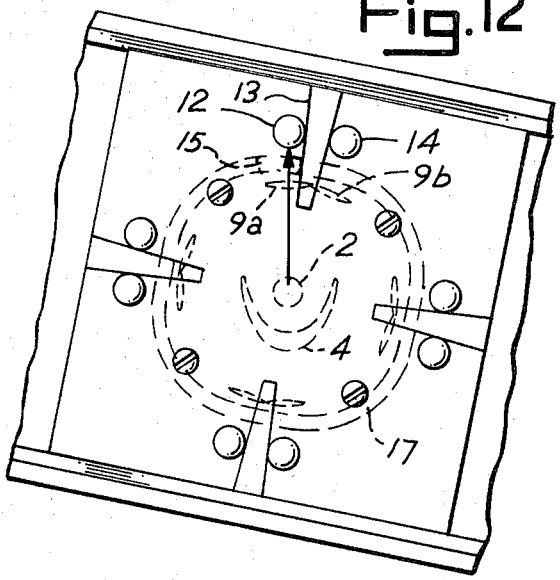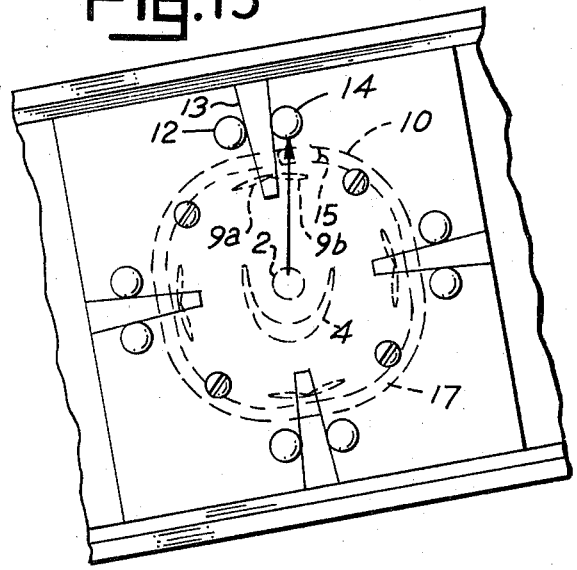

LEVELLING INSTRUMENT

CROSS REFERENCE TO RELATED APPLICATION

This application is a continuation-in-part of my co-pending application, Ser. No. 252,339 filed May 10,1972, now U.S. Pat. No. 3,793,735 the teachings of which are incorporated herein by reference.

BACKGROUND OF THE INVENTION

This invention relates to a levelling instrument, particularly a levelling instrument having means for readily determining whether the instrument is in a true level or plumb position.

Levelling instruments (commonly referred to in the art as levels) typically employ a visual responsive liquid-filled vial containing a bubble. The vial is slightly curved and a level condition is determined by visually observing the position of the bubble between a pair of lines which are spaced apart a predetermined distance. This method of determining a level condition is often subject to error due to inaccuracy in reading the bubble. For example, a levelling instrument is often utilized in areas of poor light or where the level vial is difficult to view because of the particular position of the level and the user.

In my U.S. Pat. No. 3,597,090, there is disclosed a levelling instrument wherein a level condition is indicated by the projection of light beams on a pair of projection screens. The beams are directed by a square pendulum having reflective surfaces. A level condition with this levelling instrument is readily observed from a wide variety of angles, distances and light intensities.

I have also developed another levelling instrument which provides similar benefits of readability and which is readily constructed as described in my co-pending application, Ser. No. 252,338 filed May 10, 1972. This device comprises projecting a light beam on a series of indicators to indicate the position of the level. In particular, a centrally positioned indicator indicates a level position when activated by an internal light beam. Two other indicators positioned on either side of the centrally positioned level indicator indicate a deviation from a level position. In this particular indicator configuration, it was found that certain individuals, particularly when the level was used in a bright environment, found it difficult to discern which of the indicators were activated. For example, it was sometimes difficult to determine whether the level (central) indicator was activated or whether one of the side indicators was activated.

SUMMARY OF THE INVENTION

It is an object of this invention to provide a levelling instrument utilizing a reflecting surface that is rotatable about a light source and which projects light beams to an indicator that is easy to observe from a wide variety of angles, distances and light intensities.

Another object of this invention to provide a levelling instrument which is equally suitable for both levelling and plumbing objects when orientated in either an up, down, right or left direction.

It is another object of this invention to provide a levelling instrument wherein a weighted pendulum mirror is rotatable about a light source to project a constant vertical light beam.

It is another object of this invention to provide a levelling instrument wherein a transparent conduit, partially filled with mercury, surrounds a light source, whereby the mercury flows in the conduit in response to the position of the instrument to provide a constant vertical light beam.

A further object of this invention is to provide a lens system, preferably with a focusing system, comprising a continuous transparent conduit surrounding the light which is partially filled with an opaque liquid and is adapted to transmit light from the light source to an indicator only when the reference surface is not in a plumb or level position whereby a level condition is indicated by the non-activation of the indicator.

It is a specific object of this invention to provide a focusing system which provides a simple, reliable method of selectively focusing light on an indicator.

In an embodiment, therefore, the present invention provides a levelling instrument having means for readily determining a level or plumb position. This levelling instrument includes a body member having a reference surface and a light source positioned within the body member. A reflecting surface, rotatable around the light source, is positioned within the body and is adapted to reflect light in a vertical direction irrespective of the position of the reference surface. This reflecting surface can comprise a pendulum mirror mounted on a bearing race positioned in the body member. In a preferred embodiment, however, the reflecting surface comprises a continuous, transparent, arcuate conduit surrounding the light source partially filled with mercury and adapted to contain a clear bubble for the transmission of light in a vertical direction. A non-level position is indicated by an indicator which is responsive to the light reflected from the rotatable reflecting surface when the reference surface is not in a level or plumb position. Preferably, at least two indicators are provided to indicate whether the reference surface is slanted in a right or left direction respectively. When the reference surface is in a level position, neither indicator is activated, thereby indicating the level position. The light reflected from the rotatable reflecting surface is focused and directed at the indicator thereby activating the indicator only when the reference surface is not level or plumb, whereby a level position is readily discernable by the non-activation of the indicator. This arrangement provides a more reliable indication of a non-level position.

In a more limited embodiment, the light-reflected from the rotatable reflecting surface is focused on either of two indicators by the lens positioned between the light and indicator when the reference surface is not in a level or plumb condition. Each indicator is positioned to indicate a right or left tilt of the reference surface. Preferably a continuous, transparent, arcuate conduit of a specific heart-shaped cross section surrounds the lens and light source and it is partially filled with an opaque liquid and contains a clear bubble. The clear bubble transmits light from the light source to the indicator only when the reference surface is not in a plumb or level condition.

Other objects, embodiments and a more detailed description of the foregoing embodiments will be found in the following more detailed description of the present invention.

BRIEF DESCRIPTION OF THE DRAWINGS

FIG. 1 is a side elevational view, in partial section, of a levelling instrument incorporating a preferred embodiment of the invention.

FIG. 2 is a vertical sectional view taken along section lines 2—2 of FIG. 1 showing the orientation of the light source, the lenses, the rotating reflective surface and the indicating buttons.

FIGS. 3 and 5 are diagrams indicating the operation of the levelling instrument of FIG. 1 when in non-level conditions.

FIG. 4 is a schematic view of a complete levelling instrument incorporating the invention.

FIG. 6 is a side elevational view, in partial section, of a levelling instrument incorporating an alternative, rotating mirror mechanism as embodied in the invention.

FIG. 7 is a vertical sectional view taken along section line 7—7 of FIG. 6.

FIG. 8 is a detailed perspective view of the rotating mirror mechanism.

FIG. 9 is a detailed elevational view of the rotating mirror mechanism taken along section ling 9—9 of FIG. 7.

FIG. 10 is a detailed elevational view of the lens, the indicators and the circular liquid tube.

FIG. 11 is a detailed vertical sectional view of the circular liquid tube taken along section line 11—11 of FIG. 10.

FIGS. 12 and 13 are diagrams indicating the operation of the levelling instrument of FIG. 6 when in non-level conditions.

DETAILED DESCRIPTION OF THE DRAWINGS

Referring to FIG. 4 there is illustrated a level incorporating a levelling mechanism 1. The level 1a comprises a body member 35 of elongated beam design constructed of suitable material, including aluminum or plastic, as desired, and having parallel reference surfaces 18 and 18a thereon. The levelling mechanism 1 positioned in the center thereof of the body member 35 by screws or other fastening means 16. The level or plumb of a given object is determined by placing reference surface 18 or 18a against the object in a manner known to the art.

Illustrated in FIGS. 1 through 5 is the preferred configuration of the rotatable mirrored surface. Referring to FIGS. 1 and 2, light 2 is surrounded by a transparent circular conduit 22. Preferably, conduit 22 has a rectangular cross section and the fron face portion of the curved reflecting surface has a closeable opening 22a therein for filling the conduit. Conduit 22 is partially filled with mercury thereby forming bubble 27 therein. The mercury forms an internal reflective surface within transparent conduit 22, thereby converting the transparent conduit into a mirror. As the level is placed in various positions, the mercury flows within the continuous closed path of the conduit and serves to function as a rotating reflective surface. Since mercury is a liquid, it will always seek its lowest level within conduit 22 and, as a result, bubble 27 moves and the mercury continues to reflect the light in a relatively constant vertical direction. Liquid conduit 10 has the same substantially heart-shaped cross section as illustrated in detail in FIG. 6 to aid in focusing light from light 2. Indicators 12 and 14 are identical to those described in relation to FIGS. 1 through 8. Lens 21 comprising lens members 21a and 21b is positioned between conduit 10 and conduit 22 and serves the same function as lens 9 in FIGS. 6 through 13; namely, to focus the light reflected by the mercury in conduit 22 towards indicators 12 and 14. In the embodiment illustrated, in FIGS. 1 and 2, the mirrored surface 23, conduit 10 and lens 21 are all formed from a unitary molded plastic piece for ease of construction and installation. The central portion 13 of mirrored surface 23 is blackened out or blocked out by opaque non-reflective paint or metal as described hereinafter in relation to FIGS. 6 through 13 to insure that indicators 12 and 14 are selectively activated. Wire channel 28 provides a path for the wires connecting light 2 with battery 25. The front of the levelling unit is covered by a detachable access plate 29 to allow changing of bulb 2.

In operation, the light from light 2 is reflected by the mercury contained in transparent conduit 22 vertically upward through bubble 27, lens 21 and bubble 15 and is then reflected horizontally outwards by mirror surface 23 towards the indicators 12 and 14. In the configuration illustrated in FIG. 2, the indicators are positioned on either face of the levelling instrument and mirror 23 has two sides each with a blackened out portion 13, at right angles to each other and positioned so that the light reflected by the mercury in transparent conduit 22 is directed towards the exact corner or mirrored surface 23. As a result, the light is reflected in both a left and right horizontal direction in equal amounts and activates the indicators on both faces of the instrument. This configuration can also be utilized with the rotating mirror embodiment illustrated in FIG. 6 and similarly, the mirror configuration illustrated in FIG. 6 can be utilized in the mercury reflector embodiment illustrated in FIG. 1.

The operation of the embodiment illustrated in FIG. 1 is analogous to the operation illustrated in FIGS. 3 and 5. Referring first to FIG. 3, there is illustrated the levelling device 1 when tilted slightly (i.e., up to about 5° from level) to the right. When in this position, the light from light 2 is reflected upward by the mercury in transparent conduit 22 through bubble 27, lens 21a and bubble 15 to activate indicator 12. The opaque liquid in conduit 10 and the blocked portion 13 of mirror 23 prevent any of the light rays from scattering and activating the indicators 14 Similarly, when the levelling instrument is tilted towards the left, as illustrated in FIG. 5, light from light 2 is reflected vertically upwards and passes through bubble 27, lens 21b and bubble 15. After being reflected by mirror 23, the light activates indicator 14 indicating that the levelling instrument is not in a level position. The opaque liquid in conduit 17 helps prevent any light beam from impinging on indicator 12. When the levelling instrument is in a perfectly level position, the light from light 2 passes directly upward through lens 15, bubbles 21 and 17 but impinges on blackened portion 13. As a consequence, the nonactivation of indicators 12 and 14 indicate a level position.

Referring first to FIGS. 6 and 7, there is shown an embodiment of levelling mechanism 1 which includes a light 2 powered by battery 25 and activated by on-off switch 26 that is mounted in light socket 3 and is positioned in the middle of level 1a within the body member 35. Light 2 provides a source of light to activate indicators 12 and 14 when reference surface 18 or 18a is positioned against an object and reference surface 18 lies above reference surface 18a. Indicators 12 and 14 are adapted to indicate a right or left tiltt respectively. Mirror 4, which can have either a circular or parabolic reflecting surface, surrounds light 2 at the bottom and both sides and is adapted or focused to project light in a constant vertical direction. Mirror 4 is mounted on an inner race 6 which rotates around an outer race 8 on ball bearings 7. A weight 5 is positioned on the bottom of mirror 4 preferably in the center thereof so that the mirror functions as a pendulum. This arrangement is shown in detail in FIGS. 8 and 9. In other words, irrespective of the position of level 1a, mirror 4 will rotate in conjunction with inner race 6 and will always reflect the light from light 2 in a generally vertical direction. Therefore, when reference surface 18a lies above reference surface 18, mirror 4 will rotate via inner race 6 and reflect light from light 2 in the direction on fidicators 12b and 14b. Similarly, when reference surfaces 18 and 18a lie in a plumb position, mirror 4 via inner race 6 will rotate and reflect the light from light 2 towards indicators 12a, 14a, or 12c and 14c depending on the right or left orientation or reference surfaces 18 and 18a.

Again referring to FIGS. 6 and 7, a dual lens 9 comprising left lens member 9a and right lens member 9b is positioned substantially above light 2 when reference surface 18 is tilted to the right or left respectively. The lens members direct the light reflected by mirror 4 from light 2 towards indicators 12 and 14 only when reference surface 18 is not in a substantially level position. When level 1a is not in a substantially level (or plumb) position, lens 9 will be positioned so that light will not be reflected towards any of the indicators. Since the operator of the instrument can usually tell by visual observation whether a given surface deviates substantially from a level position, no indication is needed for these great deviations. However, additional indicator lights can be provided to indicate various deviations from a level or normal position. Further, since the light reflected from mirror 4 is reflected in a vertical direction, and the indicators 12 and 14 face in a horizontal direction, the light must be deflected outward by mirror 11 towards the indicator lights. To prevent the light from activating indicator 12 when the level is tilted to the right or indicator 14 when the level is tilted to the left, the central portion 13 of mirror 11 is blacked out by a suitable mask or is simply not provided with a reflective surface. In other words, a non-reflective, opaque surface is provided. Similarly, an opaque barrier can be placed between indicators 12 and 14. This blacked out portion 13 may be obtained by the application of opaque paint to the surface of the mirror or superimposing a metallic sheet over the face of the mirror as indicated by mask 30 in FIG. 5.

A continuous transparent liquid conduit 10 surrounds mirror 4, light 2 and lens 9 and is manufactured from a suitable transparent material such as clear glass or plastic and is partially filled with an opaque liquid 17. Liquid conduit 10 is a modified tube wherein the four sides are of circular configuration and have a large radius such as, for example, a radius of about 480 inches. Bubble 15 is formed in liquid path 10 by the incomplete filling of the path with the opaque liquid. Bubble 15 functions much the same as a bubble in a liquid filled vial in a conventional level. When the reference surface 18 is tilted to the right, bubble 15 lies in the direct path between light 2 and indicator 12. This, in conjunction with blacked out central portion 13, allows the light to pass directly to indicator 12 without activating the indicator 14. Any light rays which may pass through lens 9 and which are not directed directly at indicator 12 are further intercepted by opaque liquid 17 thereby selectively activating indicator 12. This configuration is detailed in FIG. 10. As indicated, conduit 10 can be manufactured out of the conventional transparent plastic material such as acrylic plastic or glass. The opaque liquid contained within conduit 10 must be of a relatively non-wetting nature so that when the level is placed in a level position, there will be no liquid adhering to the interior walls of conduit 10 thereby interfering with its light transmission properties. A suitable liquid having this property is mercury. Experimentation has indicated that the best results are obtained when liquid conduit 10 is curved inward on its bottom or inside surface and is slightly curved outward on its top or outside surface to provide a conduit having a substantially crescent-shaped cross section as illustrated in FIG. 11. This configuration helps focus the light on the indicators. Liquid conduit 10 can be filled by closeable opening 10a communicating with the conduit.

Indicator lights 12 and 14 are conventional, light-activated, reflecting surfaces known to the art and can comprise a beaded plastic reflector surface or a ground glass surface. Preferably, each of the respective indicators are of different color; for example, indicator light 12 could be red, indicating an inclination to the right and indicator 14 could be green indicating an inclination to the left.

In actual operation, light generated by light 2 is reflected upward by mirror 4 to lens 9 where a concentrated light beam is formed. Preferably mirror 4 has a parabolic reflective surface which serves to focus the light from light 2 and aids lens 9 in focusing the light toward the indicators. This light beam then passes through bubble 15 in liquid 17 and is reflected horizontally outward by mirror 11 before it impinges upon an indicator. Since, as indicated, the indicators face horizontally outward, mirror 11 is inclined at a 45° angle to the direction of the light ray thereby deflecting the light horizontally outward through the indicators.

When the levelling instrument is tilted to the right, as indicated in FIG. 12, the light emanating from light 2 is reflected vertically upward through lens 9a. In the FIGS., the degree of tilt and indicator spacing is exaggerated for purposes of illustration. In an actual device, the indicators 12 and 14 are positioned closer to provide an accurate reading of a level position (i.e. ±0.1°). Further, since the instrument is not in a level position, center portion 13 does not lie immediately above the vertical light beam and this blacked out portion serves to mask or prevent any activation of indicator 14. It will also be noted that bubble 15 lies immediately above the vertical light beam from light 2 and aids the light in the selective actuation of indicator 12. Opaque liquid 17 further prevents any light passing through lens 9 from activating indicator 14. In a similar manner, as illustrated in FIG. 13, when the levelling instrument is tilted to the left, the light reflected from light 2 by mirror 4 passes through lens 9b and the bubble 15 shifts toward the right and activates indicator 14. Preferably, indicators 12 and 14 are close together so that they remain activated when the reference surfaces are in very close proximity to a level position. Thus when the reference surface is in a level position, neither indicator is activated. This allows the user of the instrument to readily determine if a surface is level because the human eye notices more readily a completely dark condition instead of a light condition which can vary in intensity. The same mode of operation applies to the activation of indicators 12a and 14a; 12b 14b; and, 12c and 14c depending on the exaxt position of the levelling instrument. Further, level 1a need contain only one set of indicators 12 and 14 as well as containing two or three sets as manufacturing costs dictate.

While I have shown a presently preferred embodiment of my invention, it must be understood that the invention is not limited to the particular embodiments illustrated since it may be otherwise embodied within the scope of the following claims. For example, the light reflected by the various rotating reflective surfaces can impinge on light responsive cells such as photoelectric cells which, in turn, are connected to a suitable signal means to indicate when light of a predetermined intensity is impinging thereon. Similarly, an audible signal or other type of signal means may be provided by means obvious to those trained in the art. In another alternate embodiment, the lens could be positioned between the light source and the mercury containing reflective conduit or between the opaque liquid conduit and the reflective indicators. However, for ease of construction, I prefer to position the lens between the rotating mirrored surfaces and the opaque liquid conduit.

I claim as my invention:

1. A levelling instrument having means for readily determining a level or plumb position which comprises, in combination:
   a. a body member having a reference surface;
   b. a source of light positioned within the body member;
   c. a reflecting surface rotatable about the light source, said reflecting surface adapted to reflect light in a vertical direction irrespective of the position of the reference surface;
   d. at least two indicators on the body member responsive to light reflected from the reflective surface when the reference surface is not in a level or plumb position; each indicator indicating a tilt of the reference surface to the left or right respectively; and,
   e. means on the body member for focusing and directing the light reflected in a vertical position by the reflecting surface to activate one of said at least two indicators only when the reference surface is not in a level or plumb position, whereby a level position is readily discernible by the lack of activation of any of said indicators.

2. A levelling instrument according to claim 1 wherein said reflecting surface comprises a solid reflective mirror with mirrored inner curved surfaces that encompass the bottom and sides of the light source.

3. A levelling instrument according to claim 2 wherein said mirror is weighted at the bottom to provide a rotatable pendulum mirror to reflect the light in a vertical direction.

4. A levelling instrument according to claim 2 wherein said mirror is rotatable on a bearing race positioned in the body member.

5. A levelling instrument according to claim 1 wherein said focusing means includes lenses positioned between the light and the indicator to focus light on the indicators when the reference surface is not level or plumb.

6. A levelling instrument according to claim 1 wherein said focusing means includes a continuous transparent arcuate conduit surrounding the light source; said conduit partially filled with an opaque liquid and adapted to contain a clear bubble to transmit light from the light source to an indicator only when the reference surface is not plumb or level.

7. A levelling instrument according to claim 6 wherein said arcuate conduit has a generally crescent-shaped cross section.

8. A levelling instrument according to claim 1 wherein:
   a. said reflective mirror with a mirrored inner curved surface that encompasses the bottom and sides of the light source weighted at the bottom to provide a rotatable pendulum mirror and adapted to reflect the light in a vertical direction, said mirror rotatable about a bearing race positioned in the body member; and,
   b. said focusing means include lenses positioned between the light and indicator to focus light on the indicator when the reference surface is not level or plumb and a continuous transparent arcuate conduit surrounding the lens and light source; said conduit partially filled with an opaque liquid and adapted to contain a clear bubble to transmit light from the light source to the indicators only when the reference surface is not plumb or level.

9. A levelling instrument according to claim 1 wherein said indicators are of a different color.

10. A levelling instrument according to claim 1 wherein said reflecting surface comprises a continuous transparent arcuate conduit surrounding the light source; said conduit partially filled with mercury and adapted to contain a clear bubble for the transmission of light in a vertical direction.

11. A levelling instrument according to claim 10 wherein said conduit has a rectangular cross section and the mercury encompasses the bottom and sides of the light source.

12. A levelling instrument according to claim 10 wherein said focusing means includes lenses positioned between the light and indicator adapted to focus light on an indicator when the reference surface is not level or plumb and a continuous transparent arcuate conduit surrounding the lens and light source; said conduit partially filled with an opaque liquid and adapted to contain a clear bubble to transmit light from the light source to the indicator only when the reference surface is not plumb or level.

13. A levelling instrument according to claim 10 wherein said arcuate conduit defines a closed circular path.

14. A levelling instrument according to claim 1 wherein said indicators are positioned to indicate activation of an indicator when viewed from a horizontal direction and said focusing means includes a mirrored surface adapted to direct the light reflected by the reflecting surface toward the indicator.

15. A levelling instrument according to claim 14 wherein at least a portion of the mirrored surface is not-reflective to insure selective activation of the indicators.

* * * * *